(No Model.) 2 Sheets—Sheet 2.
B. E. CRONKHITE & L. T. AUSTIN.
BAND CUTTER AND FEEDER.
No. 539,750. Patented May 21, 1895.
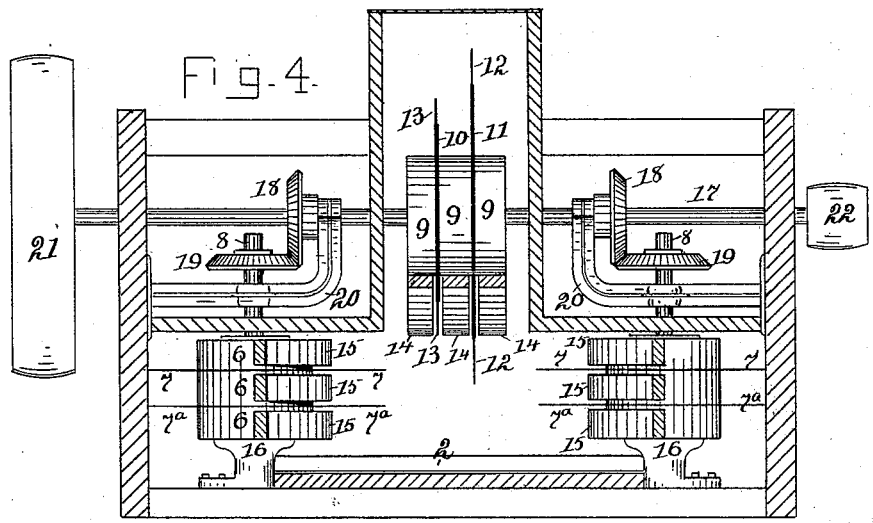
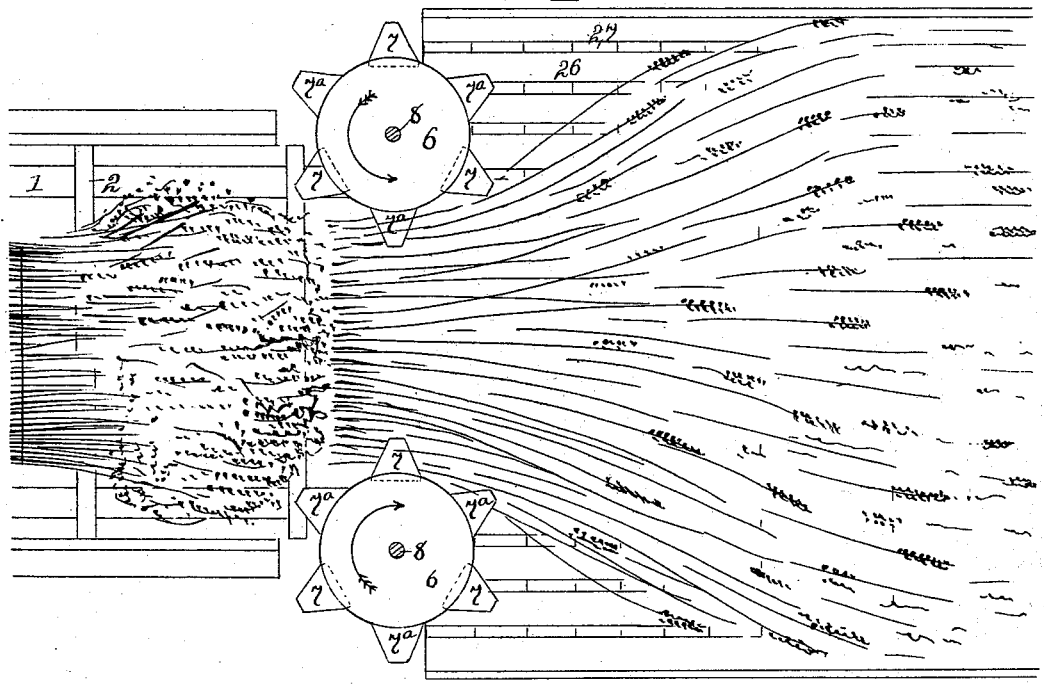
ATTEST
Helen Graham
William S. Graham
INVENTORS
Byron E. Cronkhite
and Lorey T. Austin
By L. P. Graham
Atty.

(No Model.) 2 Sheets—Sheet 1.

B. E. CRONKHITE & L. T. AUSTIN.
BAND CUTTER AND FEEDER.

No. 539,750. Patented May 21, 1895.

ATTEST.
Helen Graham
William S. Graham

INVENTORS
Byron E. Cronkhite
and Lorey T. Austin
by L. P. Graham
Atty.

UNITED STATES PATENT OFFICE.

BYRON E. CRONKHITE AND LOREY T. AUSTIN, OF ROSSVILLE, ILLINOIS.

BAND-CUTTER AND FEEDER.

SPECIFICATION forming part of Letters Patent No. 539,750, dated May 21, 1895.

Application filed March 18, 1895. Serial No. 542,083. (No model.)

*To all whom it may concern:*

Be it known that we, BYRON E. CRONKHITE and LOREY T. AUSTIN, of Rossville, in the county of Vermilion and State of Illinois, have invented certain new and useful Improvements in Band-Cutters and Feeders, of which the following is a specification.

This invention is designed to provide improved means for cutting the bands of bound grain, spreading the released grain sidewise, and feeding it gradually to the thrashing cylinder of a separator. It is exemplified in the structure hereinafter described; and it is defined in the appended claims.

Figure 1:
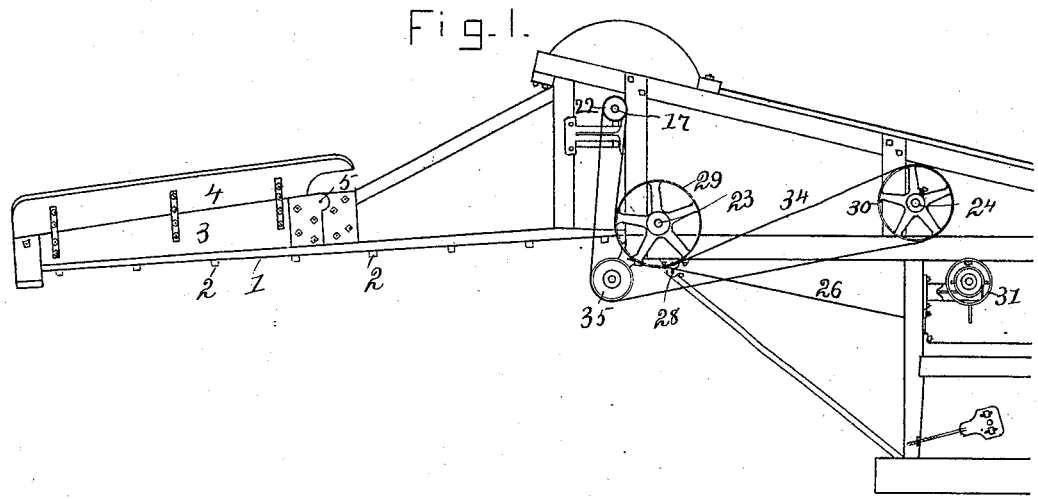
Figure 2:
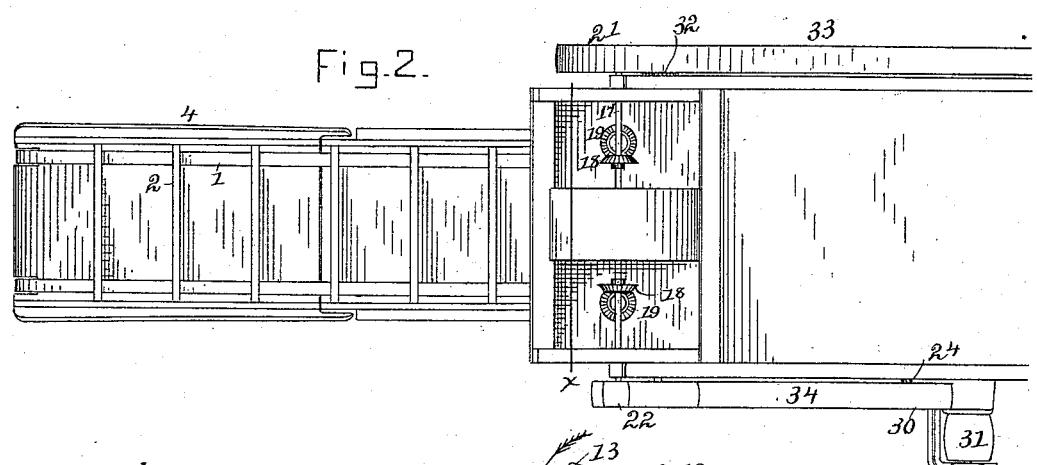
Figure 3:
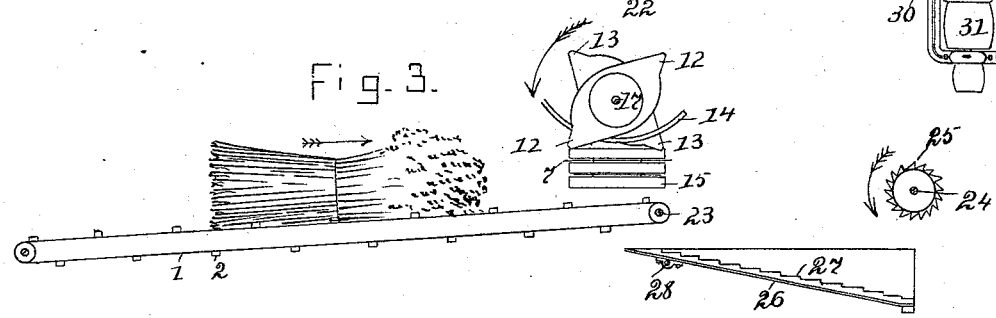

In the drawings forming part of this specification, Figure 1 is a side elevation of the band-cutter and feeder connected with or built onto the front end of a thrashing-machine. Fig. 2 is a plan of the mechanism shown in Fig. 1. Fig. 3 is a diagram showing the vertical corelation of the operative parts of the device. Fig. 4 is an enlarged section taken vertically on line X in Fig. 2. Fig. 5 is a plan diagram illustrating the spreading action of the side band-cutters.

The means for conveying the bound bundles to the cutters consists of drag belts 1, having cross slats 2 and running on suitable rollers. The extreme outer extension of the frame of the drag comprises vertical side pieces 3, hinged at 5 and surmounted by the sidewise-spreading boards 4.

The band cutting mechanism comprises two sets of horizontally-rotating disks provided on their peripheries with tooth-formed cutters as 7 and 7ª, and placed one set on each side of the path of the bundles. In addition to these a set of vertically-rotating disks, 10 and 11, provided with cutters, as 12 and 13, are placed above the path of the bundles. The vertically-rotating cutters are mounted on shaft 17, between drums 9, 9, 9, as shown in Fig. 4, and they are supplied with guard fingers 14 which coincide vertically with the drums 9 and curve backward from fastenings in the frame, substantially as indicated in Fig. 3. The disks of the horizontally-rotating cutters 7 and 7ª are also placed between drums, as shown in Fig. 4, and are supplied with guard fingers 15. They are mounted on shafts 8, and they are rotated by bevel wheels 18 and 19, the former of which are fixed on shaft 17 and the latter on shafts 8. The upper ends of shafts 8 have bearings in brackets 20, and the lower bearings of said shafts are provided with stationary housings 16 which prevent straw from winding around the shafts.

A pan, 26, is located under and to the rear of the cutters. It has sliding bearings at its lower end and its upper, front end is carried on crank shaft 28. Shaft 24 extends across the rear end of the pan, and it is supplied with toothed feeding disks 25 constructed substantially as shown in Fig. 3 and separated one from another by interposed drums. The pan is preferably supplied with toothed strips 27 which extend lengthwise of the bottom of the pan and coact with the feeding disks 25 in supplying the grain to the thrashing cylinder.

The pulley 21, on shaft 17 is driven from the thrasher by belt 33. Pulley 22 is fixed on the end of shaft 17 opposite pulley 21. Pulley 29 is fixed on shaft 23, which drives the feed drag 1, and pulley 30 is fixed on the shaft 24 of the feed disks 25. Belt 34 conveys motion from shaft 17 to shafts 23 and 24 by running on pulleys 22 and 30 and passing around pulley 29 and idler 35, as shown in Fig. 1. Shaft 23 extends across the frame and is supplied on its far end with a sprocket wheel from which chain 32, seen only in Fig. 2, conveys motion to the crank shaft 28. The shaft of the thrasher cylinder is shown at 31, and indicates the relation of the other parts to the cylinder. The motion of the pan-carrying crank shaft is upward and backward, and the direction of motion of other parts is indicated by adjacent arrows.

Bundles of grain are supplied to the drag, as indicated in Figs. 3 and 5, and are carried one after another between the side cutters and under the upper cutters. The cutters are so placed with reference to the dimensions of the bundles that the cutters penetrate the bundles sufficiently far to reach and sever the bands. As the bands are severed the grain is carried forward and sidewise, with a scattering tendency, by the side cutters, while the upper cutters aid in the general result by advancing the upper portion of the bundle more rapidly than the lower part. The effect of the side cutters, in scattering the grain, is represented graphically in Fig. 5, and this diagram also gives an idea of the corresponding action of the upper cutters. In this connection it may be stated that the cutters of different disks are arranged alternately, as shown in Fig. 3 for instance, the result being that with a given number of cutters the chance of cutting the bands is increased. The grain passes in its spread out condition to the pan 26 and is advanced by the toothed bars of the pan toward the cylinder and the feed disks 25. When it reaches the disks it is fed into the thrasher uppermost layer first, something after the manner of hand feeding, and is of course thoroughly scattered.

The obvious function of the guard fingers is to prevent the straw from winding around the cutter shafts, and the pivot 5 enables the front part of the drag-belt frame to be folded backward for transportation.

Having thus described our invention, we claim as new and desire to secure by Letters Patent—

1. A band cutter and spreader consisting of a bundle carrier, and two sets of horizontally-rotating cutters placed on opposite sides of the path of the bundles and extending into said path, substantially as set forth.

2. A band cutter and feeder consisting in the combination of a bundle carrier, two sets of horizontally-rotating cutters placed on opposite sides of and extending into the path of the bundles, and a set of vertically-rotating cutters placed above and extending into the path of the bundles, substantially as set forth.

3. In band cutters and feeders, the combination of a bundle carrier, a horizontal transverse shaft, above the carrier, provided with cutters, vertical shafts one on each side of the carrier, gearing between the transverse shaft and the vertical shafts, and cutters on the vertical shafts, substantially as set forth.

4. In band cutters and feeders, the combination of a bundle carrier, rotating cutters above and at the sides of the path of the bundles, a shaker pan below and cutters on vertical shafts at the rear of the cutters, and a toothed feed cylinder above and at the rear end of the pan, substantially as set forth.

In testimony whereof we sign our names in the presence of two subscribing witnesses.

BYRON E. CRONKHITE.
LOREY T. AUSTIN.

Attest:
W. B. REDDEN,
J. W. VEATCH.